United States Patent

[11] 3,548,112

[72] Inventor Roy E. Pearson
Seattle, Wash.

[21] Appl. No. 761,019

[22] Filed Sept. 13, 1968

[45] Patented Dec. 15, 1970

[73] Assignee the United States of America as represented by the Secretary of the Navy. by mesne assignment

[54] MULTICHANNEL COHERENT AMPLITUDE RECORDING AND REPRODUCING SYSTEM

1 Claim, 2 Drawing Figs.

[52] U.S. Cl. .......... 179/100.1, 178/6.6A, 340/174.1

[51] Int. Cl. .......... G11b 5/00

[50] Field of Search .......... 179/100.1, 100.1(TC), 100.2(K), 100.2(S); 340/174.1(B), 174.1(G), 174.1(H); 331/51; 178/6.6(A)

[56] References Cited

UNITED STATES PATENTS

| | | | |
|---|---|---|---|
| 3,096,483 | 7/1963 | Ransom | 331/51 |
| 3,433,903 | 3/1969 | Murray | 179/100.2 |
| 3,017,616 | 1/1962 | Runyan | 179/100.2 |

*Primary Examiner*—Bernard Konick

*Assistant Examiner*—Raymond F. Cardillo, Jr.

*Attorney*—Raymond I. Tompkins, John W. Pease and John F. Miller

ABSTRACT: The invention avoids coherent phase errors in a multichannel recording and reproducing system by heterodyning the input information channels with heterodyning frequencies derived from a common base frequency. The effects of recorder tape skew, wow, and flutter are eliminated in the reproduced information by demodulating with frequencies derived from a recorded pilot frequency which is affected by tape skew, wow, and flutter to the same degree as the information channels. The effects of drift in components such as oscillators, etc. is eliminated by deriving all the heterodyning and demodulating frequencies from a common base frequency using digital techniques.

Roy E. Pearson
INVENTOR.

BY John F. Miller Agent
John M. Pearson Attorney

Roy E. Pearson
INVENTOR.

BY John F. Miller Agent
Attorney

MULTICHANNEL COHERENT AMPLITUDE RECORDING AND REPRODUCING SYSTEM

BACKGROUND OF THE INVENTION

This invention is in the field of recording and reproducing. Among the many problems encountered in the prior art have been the reduction of coherent phase errors in multichannel systems, the reduction of wow and flutter in recorders, and the reduction of frequency drift in various components. Many attempts have been made to solve these problems; however, prior to applicant's invention, only limited success had been achieved.

SUMMARY OF THE INVENTION

The invention provides a plurality of heterodyning frequencies, all derived by digital techniques from a common recorder synchronizing frequency, for mixing with a plurality of information frequencies to be recorded. Since the heterodyning frequencies are derived from a common frequency, phase errors between channels are eliminated. A pilot frequency digitally derived from the common recorder frequency is recorded on a tape with the heterodyned information.

The term "digitally derived" as used herein refers to the use of digital counters, dividers, or equivalent devices, for dividing a common frequency into selected frequencies. The use of digital elements for frequency division assures accuracy and stable relationships between frequencies. When the recorded information is reproduced, the recorded pilot frequency is reproduced to serve as a common frequency from which a plurality of demodulating frequencies are digitally derived. The information channels are demodulated with a respective demodulating frequency. The use of digitally derived frequencies eliminates the effect of drift in circuit components. Since the reproduced pilot frequency and derived demodulating frequencies have been affected by tape skew, wow, and flutter to the same degree as the reproduced information, the demodulated information is free of these effects.

DESCRIPTION OF THE PREFERRED EMBODIMENT

Figure 1:
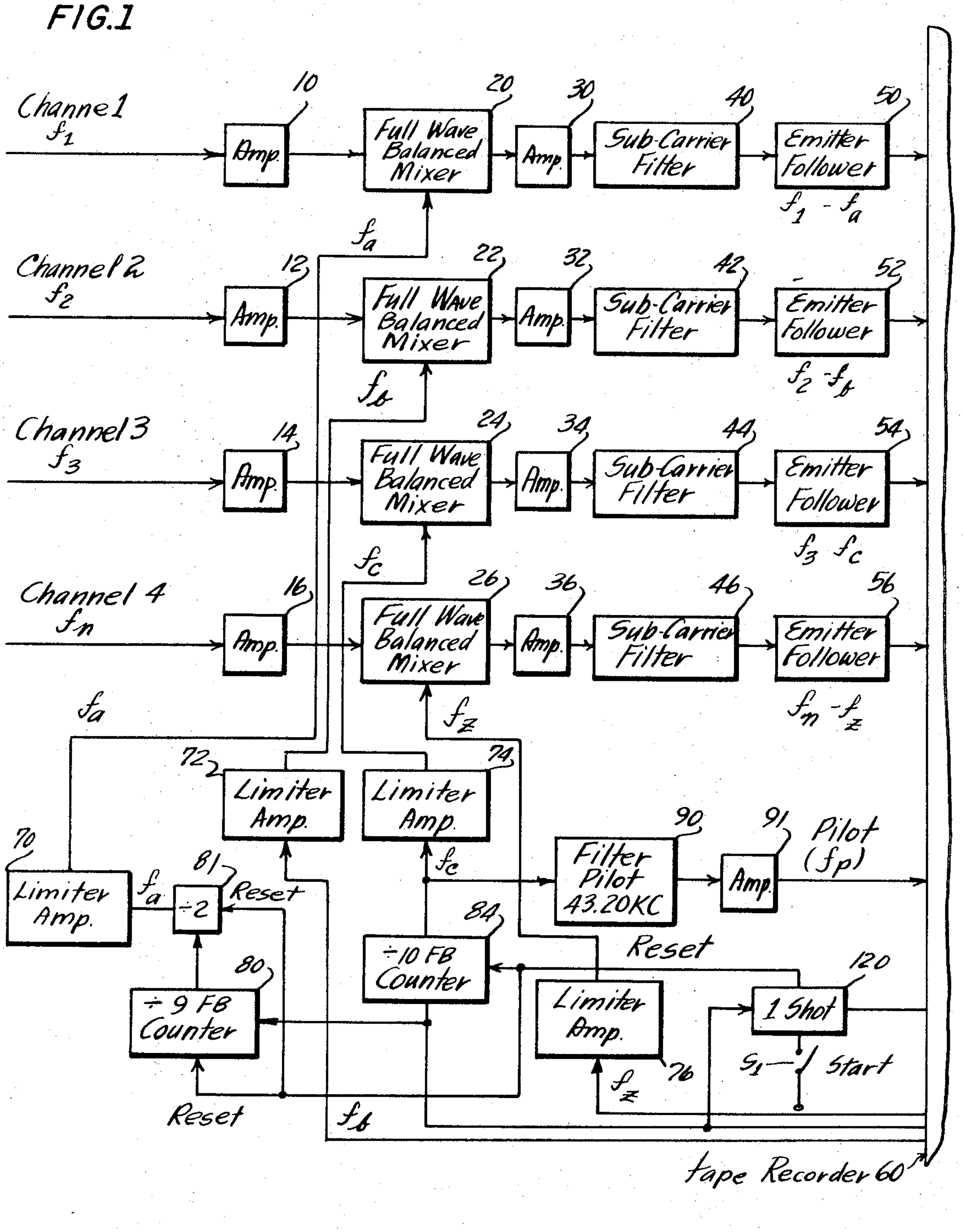
FIGS. 1 and 2 comprise a block diagram showing the structural and functional interrelationships of the principal elements of the invention.

The principles of the invention are illustrated in the drawings. In FIG. 1 four information input channels, 1, 2, 3, and 4, furnish signal frequencies $f_1$, $f_2$, $f_3$, and $f_n$ to be recorded. These frequencies are amplified in respective amplifiers 10, 12, 14, and 16, and then mixed in respective full wave balanced mixers 20, 22, 24, and 26, with respective heterodyning frequencies $f_a$, $f_b$, $f_c$, and $f_z$. Mixers 20, 22, 24, and 26 are phase stable ring modulators which reject all harmonics produced by heterodyning by a factor of 60 *db*. The subcarrier output or difference frequencies from mixers 20, 22, 24, and 26 are amplified by respective amplifiers 30, 32, 34, and 36, and filtered by respective subcarrier filters 40, 42, 44, and 46 to eliminate the undesired output frequencies from the mixers. The remaining subcarrier frequencies $f_1 - f_a$, $f_2 - f_b$, $f_3 - f_c$, and $f_n - f_z$ are then forwarded through respective emitter follower circuits 50, 52, 54, and 56 to be recorded in tape recorder 60.

The heterodyning frequencies $f_a$, $f_b$, $f_c$, and $f_z$ are derived from reference frequency generating circuits in recorder 60, and are selected so as to heterodyne the information signal frequencies into a 40 kc band centered at 216 kc on a single track in tape recorder 60. Recorder 60 may be a commercially available recorder having built-in precision frequency generating means, for example a Honeywell Model 7700 Recorder having a 3.456 mc crystal controlled oscillator and several precision countdown frequency outputs for the control of external systems. Since the heterodyning frequencies are derived from a single source, phase errors between channels are avoided. Filters 40, 42, 44, and 46 are third order filters providing 40 db of rejection to cochannel interference from adjacent channels. Additionally, all difference frequencies between the channels fall within the rejection band of filter 42. Recorder 60 contains a crystal controlled 3.456 mc oscillator and count down circuits (not shown), for developing a plurality of precise frequencies. Two of the heterodyning frequencies, *f b* and $f_z$, are obtained directly from these frequency generating circuits in recorder 60 over the lines shown. These are connected to mixers 22 and 26 through respective limiter amplifiers 72 and 76. Heterodyning frequency $f_c$ is obtained by dividing a frequency from recorder 60 in a divide-by-ten feedback counter 84, and forwarded through limiter amplifier 74 to mixer 24. Heterdyning frequency $f_a$ is derived by dividing a recorder frequency in a divide-by-nine feedback counter 80 and a cascaded divide-by-two square wave circuit 81. Frequency $f_a$ is forwarded to mixer 20 through limiter amplifier 70. Limiter amplifiers 70, 72, 74, and 76 provide isolation and low impedance drive for mixers 20, 22, 24, and 26. The exact frequency dividing arrangement may vary depending on the frequencies available in the recorder employed, as long as the heterodyning frequencies originate from a single source. Heterodyning frequency $f_c$ is filtered in a filter 90, amplified in amplifier 91, and recorded in tape recorder 60, as pilot frequency $f_p$. As pilot frequency $f_p$ is recorded, it is modulated in accordance with the skew, wow, and flutter characteristics of recorder 60, as are the subcarrier frequencies $f_1 - f_a$, $f_2 - f_b$, etc., previously described.

Figure 2:
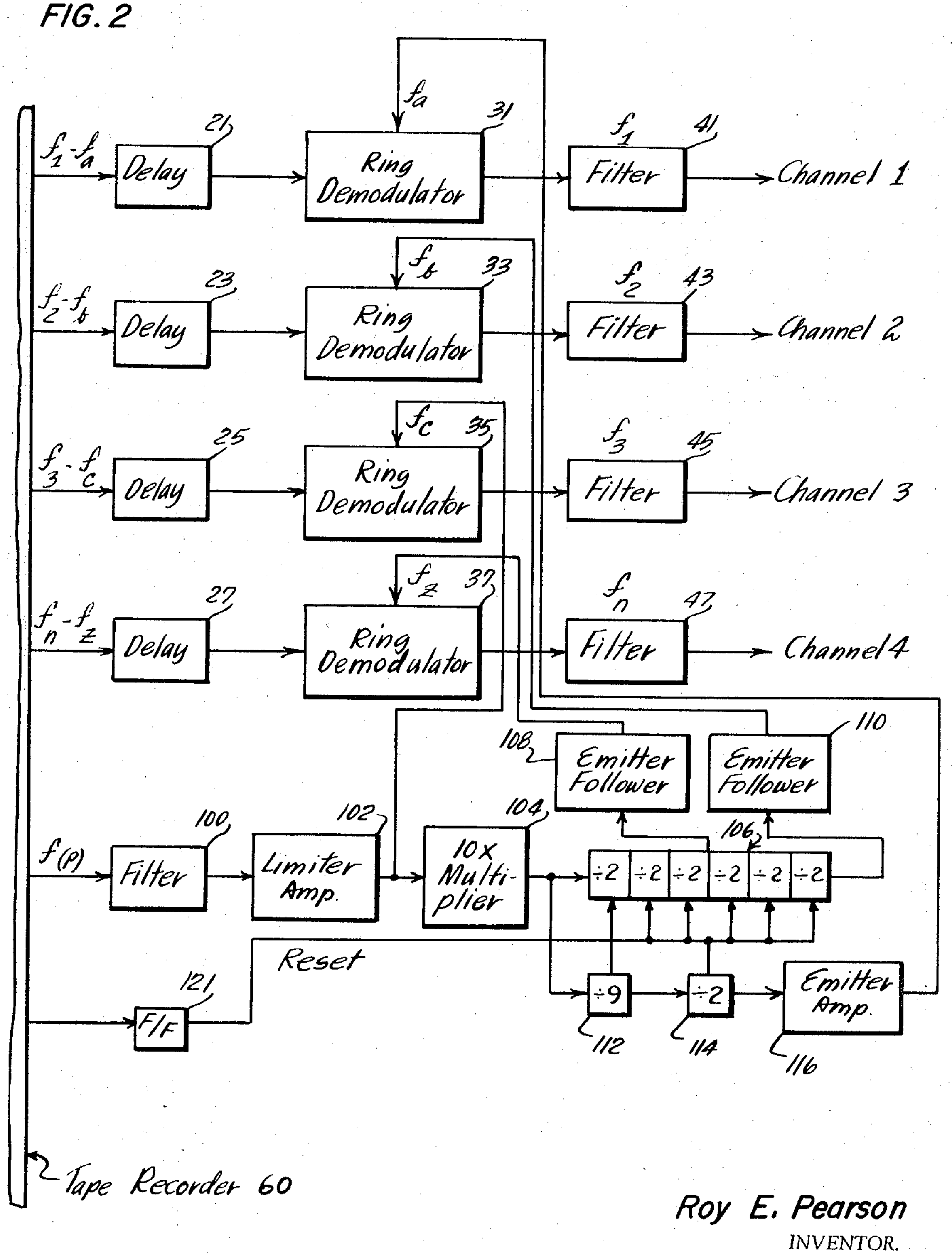

Now, referring to FIG. 2, when the information recorded in recorder 60 is reproduced, the information in channels 1—4 goes through respective delays 21, 23, 25, and 27 to respective ring demodulators 31, 33, 35, and 37. The delays 21, 23, 25, and 27 are adjusted to compensate for time lag in frequency sources and filters. After demodulation the information is filtered in respective filters 41, 43, 45, and 47. Ring demodulators 31, 33, 35, and 37 are supplied with digitally derived demodulating frequencies $f_a$, $f_b$, $f_c$, and $f_z$, so the filtered output of the respective channels 1, 2, 3, and 4 is $f_1$, $f_2$, $f_3$, and $f_n$.

The demodulating frequencies are derived by reproducing the pilot frequency $f_p$ in recorder 60, filtering and amplifying $f_p$ in a filter 100 and a limiter amplifier 102 to obtain frequency $f_c$, then multiplying and dividing $f_c$ to obtain the other demodulating frequencies. The frequency $f_c$ is first multiplied by a factor of ten in multiplier 104, then divided by a factor of eight in the first three stages of a binary counter 106 to obtain the frequency $f_z$. The frequency $f_z$ is connected to ring demodulator 37 through an emitter follower 108. In a like manner $f_b$ is obtained by dividing the frequency $10f_c$ by a factor of 64, using all six stages of binary counter 106. The frequency $f_b$ is fed to ring demodulator 33 through an emitter follower 110. In a like manner $f_a$ is derived from $10f_c$ by dividing $10f_c$ by a factor of nine in a counter 112, then dividing the output of 112 in a divide-by-two circuit 114. The output of 114, $f_a$, is fed to ring modulator 31 through a limiter amplifier 116. A ring modulator may be used as a modulator, demodulator, or phase detector, and may comprise four diodes or equivalent elements connected in a ring shaped structure in such manner that current can flow easily in one direction around the ring and is prevented from flowing in the opposite direction by the high impedance of the diodes. Input and output connections are made at the four nodal points of the ring. Ring modulators are described at, for example, page 432 of the text "Modern Dictionary of Electronics." by Graf, published by the Bobbs-Merrill Co., Inc. of New York. Ring modulators are used in the present invention because they reject or greatly attenuate all of the harmonics produced by the heterodyning.

Since the demodulating frequencies are derived from the reproduced pilot frequency $f_p$, which is identical with the original pilot frequency except for the modulation effected by the skew, wow, and flutter characteristics inherent in recorder 60, the demodulating frequencies will also embody the modulation effected by the recorder characteristics. Therefore, when the reproduced information frequencies $f_1-f_a, f_2-fb$, etc., in channels 1—4 are demodulated with the reproduced frequencies, the skew, wow, and flutter effects imposed by recorder 60 will be removed. Therefore, the output information in channels 1—4 will be $f_1, f_2, f_3$, and $f_n$, the same as the input information.

Means for resetting the counters 80, 81, 84, 106, 112, and 114 are shown as a one-shot multivibrator 120 and the connecting reset lines shown. A start switch $S_1$ is connected to the one-shot multivibrator 120. The arrangement is such that when the apparatus is started, all the counters are reset.

Since all the heterodyning and demodulating frequencies are digitally derived from a sync frequency in recorder 60, the effects of drift in circuit components such as oscillators, etc., are eliminated.

Obviously many modifications and variations of the present invention are possible in the light of the above teachings. It is therefore to be understood that within the scope of the appended claims the invention may be practiced otherwise than as specifically described.

I claim:

1. In a multichannel recording and reproducing system having a plurality of information channels, the improvement comprising:

a plurality of ring modulator mixing means, one for each respective channel, means for deriving a plurality of heterodyning frequencies from a common base frequency, said heterodyning frequencies being mixed with the information in the respective channels in said mixing means, a plurality of subcarrier filter means connected to the output of each respective mixing means to obtain a plurality of difference frequencies and to eliminate cochannel interference from adjacent channels, means for recording the said difference frequencies, means for deriving a pilot frequency from said common base frequency, means for recording said pilot frequency, means for reproducing said difference frequencies and said pilot frequency, tandem connected digital multiplying and dividing means for simultaneously deriving a plurality of demodulating frequencies from said reproduced pilot frequency, and ring demodulator means for demodulating said reproduced difference frequencies with respective ones of said demodulating frequencies, said means for deriving said heterodyning frequencies comprising a plurality of digital counters for dividing said common base frequency.